US012752905B2

(12) United States Patent
Keil et al.

(10) Patent No.: US 12,752,905 B2
(45) Date of Patent: Oct. 6, 2026

(54) CONFIGURABLE AIRCRAFT AISLE FLOORING SYSTEM

(71) Applicant: Textron Aviation Inc., Wichita, KS (US)

(72) Inventors: Trenton Keil, Haysville, KS (US); Jeremy Greene, Clearwater, KS (US); Robert Bair, Wichita, KS (US); Jeffrey Johannsmeyer, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 35 days.

(21) Appl. No.: 18/932,883

(22) Filed: Oct. 31, 2024

(65) Prior Publication Data

US 2025/0145272 A1 May 8, 2025

Related U.S. Application Data

(60) Provisional application No. 63/596,589, filed on Nov. 6, 2023.

(51) Int. Cl.
*B64C 1/18* (2006.01)

(52) U.S. Cl.
CPC .................................... *B64C 1/18* (2013.01)

(58) Field of Classification Search
CPC ........................................................ B64C 1/18
See application file for complete search history.

(56) References Cited

U.S. PATENT DOCUMENTS

| | | | | |
|---|---|---|---|---|
| 8,226,034 | B2 * | 7/2012 | Huber | B64C 1/18 244/119 |
| 8,702,036 | B2 * | 4/2014 | Curry | B64D 9/00 244/119 |
| 9,887,586 | B2 * | 2/2018 | Schomacker | H02J 50/10 |
| 2013/0340364 | A1 * | 12/2013 | Haselmeier | H02G 3/04 52/220.2 |
| 2014/0367055 | A1 * | 12/2014 | Ebeling | E06B 3/94 160/84.06 |

* cited by examiner

*Primary Examiner* — Joshua J Michener
*Assistant Examiner* — Ryan Andrew Yankey
(74) *Attorney, Agent, or Firm* — Avek IP, LLC

(57) ABSTRACT

A configurable aircraft aisle flooring system which includes a flat floor configuration and a drop-down aisle configuration. The flat floor configuration provides floor panels positioned to span across a trough of an aircraft aisle to form a level surface between upper sections of an aircraft aisle. The drop-down aisle configuration provides floor panels positioned below the upper section of the aircraft aisle to have a drop-down step between the upper sections of the aircraft aisle.

17 Claims, 7 Drawing Sheets

CONFIGURABLE AIRCRAFT AISLE FLOORING SYSTEM

CROSS-REFERENCE TO RELATED APPLICATIONS

This application claims the benefit of U.S. Provisional Patent Application No. 63/596,589, filed Nov. 6, 2023, the entire contents thereof are herein incorporated by reference.

BACKGROUND

1. Field

The disclosure relates generally to the field of aircraft interiors. More specifically, the disclosed embodiments relate to aircraft interior aisles.

2. Related Art

It is known for an aircraft to have a flat floor aisle configuration. It is also known for an aircraft to have a drop-down aisle configuration.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a configurable aircraft aisle flooring system, the system including: a configurable floor for an aircraft aisle having a flat floor configuration and a drop-down aisle configuration, wherein the configurable floor includes: a trough disposed between a first upper surface and a second upper surface, wherein the first and second upper surfaces are elevated above the trough and the first and second upper surfaces extend outboard from opposing sides of the trough; a first mounting strip disposed along an inboard edge of the first upper surface and a second mounting strip disposed opposite the first mounting strip along an inboard edge of the second upper surface; a plurality of floor panels each configured to fasten to the first and second mounting strips for spanning across the trough between the first and second upper surfaces for providing the flat floor configuration; and a drop-down floor configured to attach to the trough when the floor panels are removed to provide the drop-down aisle configuration.

In some embodiments, the techniques described herein relate to a system wherein the drop-down floor is below the first and second upper surfaces in the drop-down aisle configuration and the floor panels form a flat floor that is level with the first and second upper surfaces in the flat floor configuration.

In some embodiments, the techniques described herein relate to a system wherein the drop-down aisle configuration includes a bottom floor disposed in between a front panel and a rear panel, the front panel extending upwards at a front edge of the bottom floor and the rear panel extending upwards from a back edge of the bottom floor.

In some embodiments, the techniques described herein relate to a system including a plurality of support members each configured to mechanically couple to the first and second mounting strips for supporting the floor panels.

In some embodiments, the techniques described herein relate to a system wherein the support members each include floor fastening arrangements configured to secure the support members to the floor panels.

In some embodiments, the techniques described herein relate to a system including a fastening element disposed on the bottom floor configured to fasten the floor panels to the bottom floor in the drop-down aisle configuration.

In some embodiments, the techniques described herein relate to a system wherein the fastening element is a hook and loop fastener.

In some embodiments, the techniques described herein relate to a system wherein the first mounting strip and the second mounting strip each include a ramp portion configured to connect from the first and second upper surfaces to a lower surface, the lower surface being elevated above the trough bottom but beneath the first and second upper surfaces.

In some embodiments, the techniques described herein relate to a system including a ramp support structure configured to support one or more floor panels for forming a ramped floor.

In some embodiments, the techniques described herein relate to a system wherein the ramp support structure includes a longitudinal member which connects to an outer edge of the ramp support structure and is pitched at an upwards angle relative to the lower surface.

In some embodiments, the techniques described herein relate to a system wherein the longitudinal member is fixed to the support members beneath the floor panels of the ramped floor.

In some embodiments, the techniques described herein relate to an aisle flooring system for an aircraft including: a configurable floor for an aircraft aisle wherein the configurable floor includes: a flat floor configuration including a plurality of floor panels configured to extend above a trough positioned in between a first upper surface and a second upper surface, wherein the first and second upper surfaces are elevated above the trough and the first and second upper surfaces extend outboard from opposing sides of the trough; a drop-down aisle configuration including a bottom floor disposed in between a front panel extending upwards at a front edge of the bottom floor and a rear panel extending upwards from a back edge of the bottom floor, and the bottom floor is configured to attach to the trough in between the first and second upper surfaces; wherein either the flat floor configuration or the drop-down aisle configuration is disposed in the aircraft.

In some embodiments, the techniques described herein relate to a system including fastening strips disposed on the first upper surface and the second upper surface.

In some embodiments, the techniques described herein relate to a system including a plurality of support members each configured to mount to the fastening strips beneath the plurality of floor panels and support the floor panels.

In some embodiments, the techniques described herein relate to a system wherein the plurality of support members include a first configuration and a second configuration wherein the first and second configurations include a flat surface, and the first configuration includes a gap in its surface.

In some embodiments, the techniques described herein relate to a system wherein the first configuration of support members is disposed in between pairs of adjacent floor panels and supports the pair of floor panels.

In some embodiments, the techniques described herein relate to a system including a ramp support structure configured to support the floor panels at an angle to form a ramped floor connecting floor panels level with the first and second upper surfaces and the floor panels level with a lower surface, the lower surface being elevated above the trough bottom but beneath the first and second upper surfaces.

In some embodiments, the techniques described herein relate to a configurable aircraft aisle flooring system, the system including: a configurable aircraft floor configured to provide a flat floor in a first configuration or a drop-down aisle in a second configuration, wherein the configurable aircraft floor includes: a pair of outboard sections positioned at an upper elevation along outboard sides of an aircraft fuselage; an inboard section positioned at a lower elevation between the pair of outboard sections; a first mounting strip disposed along an upper edge of a first outboard section of the pair; a second mounting strip disposed along an upper edge of a second outboard section of the pair, opposite the first outboard section, wherein a plurality of support members are configured to mechanically couple to corresponding mounting strips on the pair of outboard sections, and a plurality of floor panels are configured to be secured to the plurality of support members for forming the flat floor above the inboard section and level with the upper elevation; and a mounting rail disposed above the inboard section, wherein the inboard section is configured to receive the drop-down aisle that mounts to the mounting rail for forming the drop-down aisle at the lower elevation.

In some embodiments, the techniques described herein relate to a system including a middle elevation having floor panels which are elevated above the lower elevation but beneath the upper elevation.

In some embodiments, the techniques described herein relate to a system including a ramped floor having angled floor panels configured to provide a ramp connecting the floor panels of the upper elevation with floor panels at the middle elevation.

BRIEF DESCRIPTION OF THE DRAWING FIGURES

Embodiments of the invention are described in detail below with reference to the attached drawing figures. The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
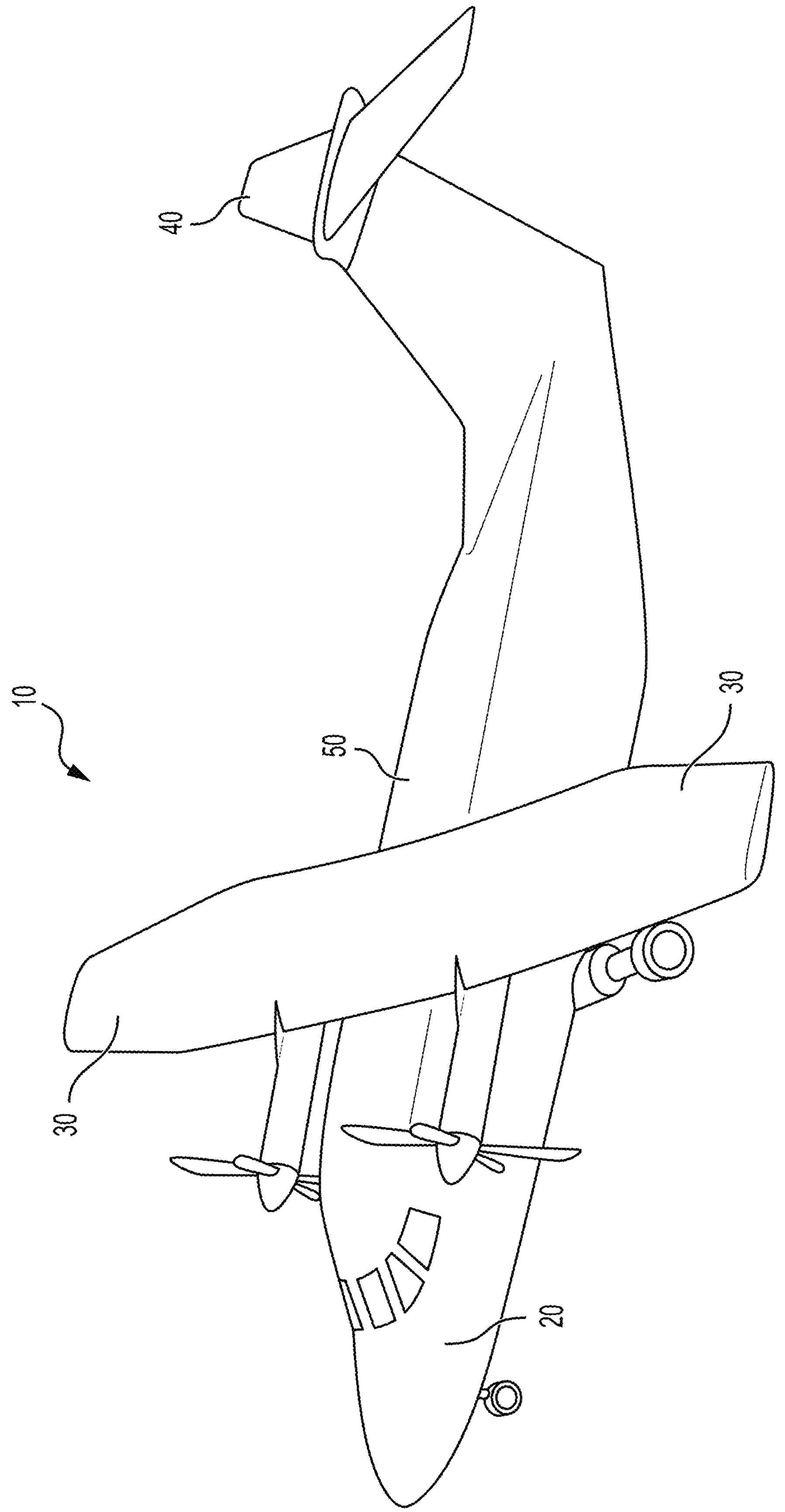
FIG. 1 shows a perspective view of an aircraft having a fuselage for installing a configurable aircraft aisle flooring system.

Embodiments disclosed herein provide a modified aircraft aisle system. FIG. 1 shows an aircraft 10 containing a cockpit 20, wings 30, a tail 40, and a fuselage or main body 50. The fuselage 50 generally resides behind the cockpit 20, between the wings 30, and in front of the tail 40. The fuselage 50 may have a generally tubular construction intended to hold the crew, passengers, and/or cargo of the aircraft 10. The aircraft 10 typically has one or more sections 60 (e.g., seating sections) (FIGS. 2A and 2B) arranged along a length of the aircraft 10 within the fuselage 50, with an adjacent aisle facilitating user travel along the aircraft 10 length.

Figure 2A:
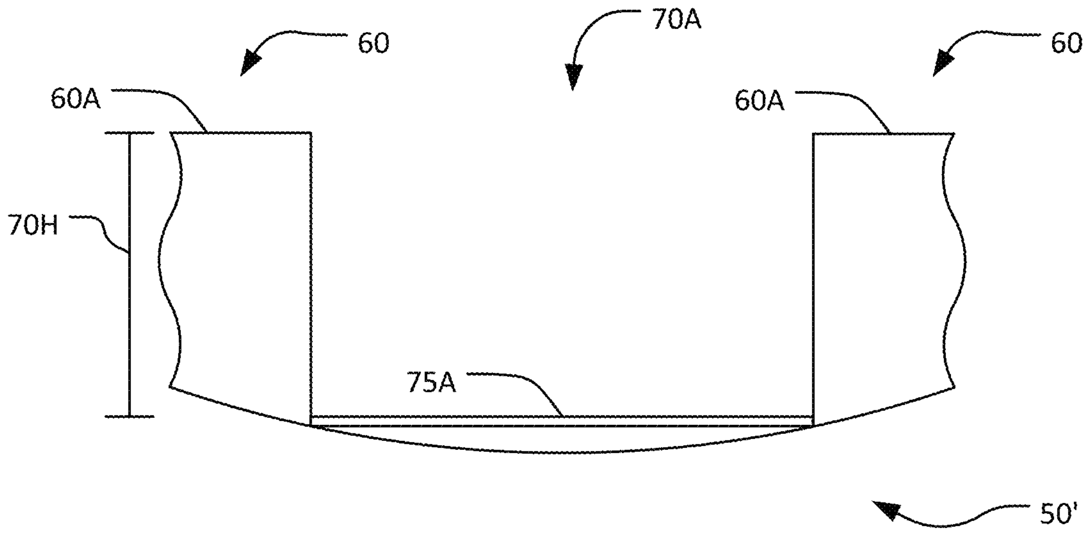
FIG. 2A (PRIOR ART)
FIG. 2A shows a cross-sectional view of an aircraft cabin including a prior art arrangement of a dropped floor in an aircraft aisle.
Figure 2B:
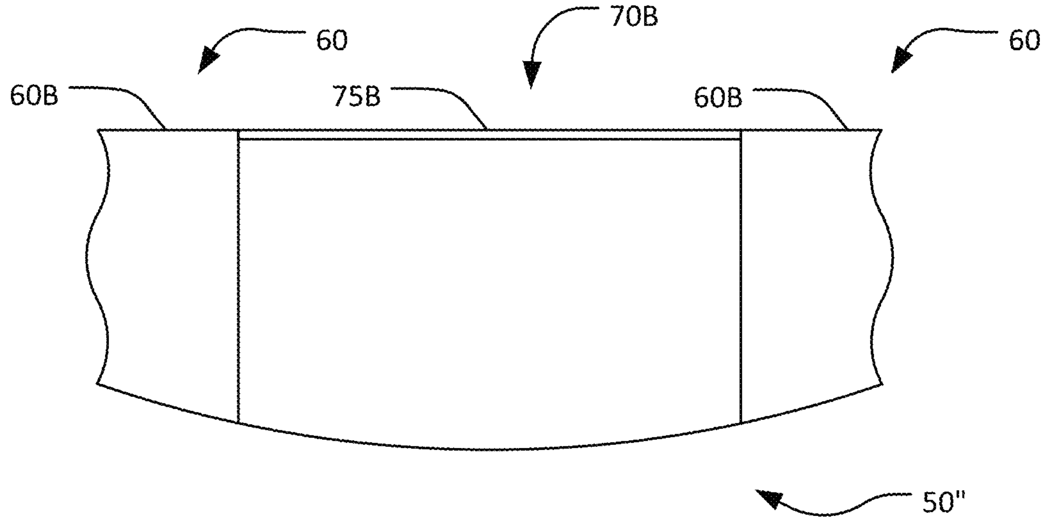
FIG. 2B (PRIOR ART)
FIG. 2B shows a cross-sectional view of an aircraft cabin including a prior art arrangement of a flat floor in an aircraft aisle.

Conventional aircraft 10 aisle configurations are designed with one type of floor configuration. The aircraft 10 aisles are generally built in one of two configurations: a flat floor configuration and a drop-down floor configuration. FIGS. 2A and 2B show examples of a prior art fuselage 50' and 50" having a drop-down aisle or floor 70A and a flat aisle or floor 70B, respectively. Typically, the drop-down aisle 70A has a walking space 75A that resides below adjacent floors 60A of the sections 60 by a height 70H, and the flat aisle 70B has a walking space 75B that is substantially level with floors 60B of the sections 60.

Aircraft having the drop-down aisle 70A have increased headroom relative to flat aisle configurations, since the walking space 75A is lower (e.g., by the height 70H) than the floor 60A. Users may step down from the sections 60 onto the walking space 75A to move about the aircraft 10. Increased headroom may be desirable in aircraft aisles since it is a common location for users to stand and walk around, especially for smaller aircraft. The aircraft 10 may better accommodate user height and mobility with a drop-down floor. However, the drop-down configuration is not without its own drawbacks. For example, some users may have difficulty navigating the drop from the floor 60A to the walking space 75A. In other cases, the aesthetics of a dropped-down aisle may be undesirable. Additionally, an ability for seats to translate toward the center of the cabin to enable swiveling may be impaired with a drop-down floor. Some aircraft manufacturing applications may choose a flat floor configuration to avoid these drawbacks where it is acceptable to reduce the total available headroom along the aisle of the aircraft. A system is needed which allows for either a drop-down floor or a flat floor aircraft aisle to be installed onto preexisting aircraft structure late in the manufacturing process of the aircraft.

Embodiments herein include an aircraft aisle system which allows for the floor configuration to be interchanged between a drop-down aisle and a flat floor after the start of aircraft production line assembly. The ability to switch between the drop-down floor and the flat-floor aisle configurations can include a bolt-in design and enables a late point definition, meaning the aisle floor configuration (i.e., either flat floor or drop-down) may be determined after substantial manufacturing/assembly has been performed on the aircraft. This can create more flexibility for an aircraft manufacturer to meet a customer's selection of floor type later in the aircraft manufacturing process.

Figure 3A:
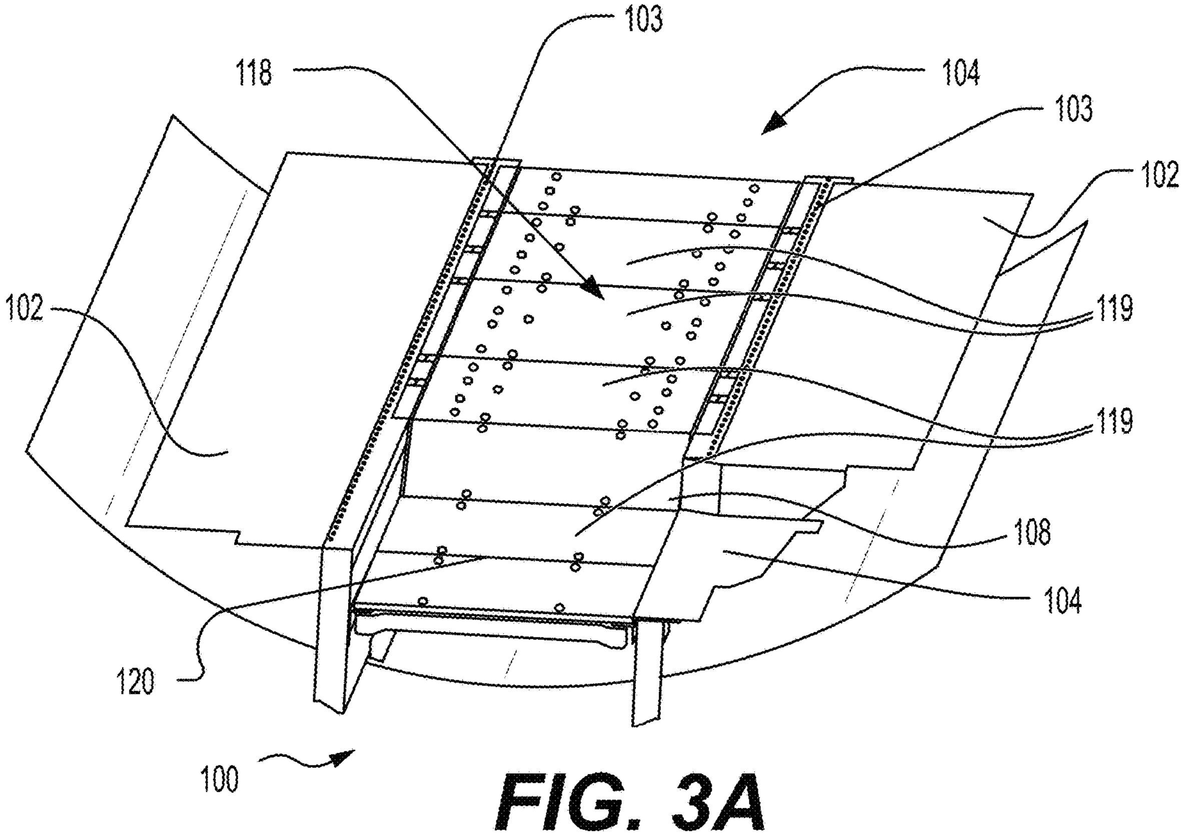
FIG. 3A shows a perspective view of a configurable aircraft aisle flooring system installed in a flat floor configuration.
Figure 3B:
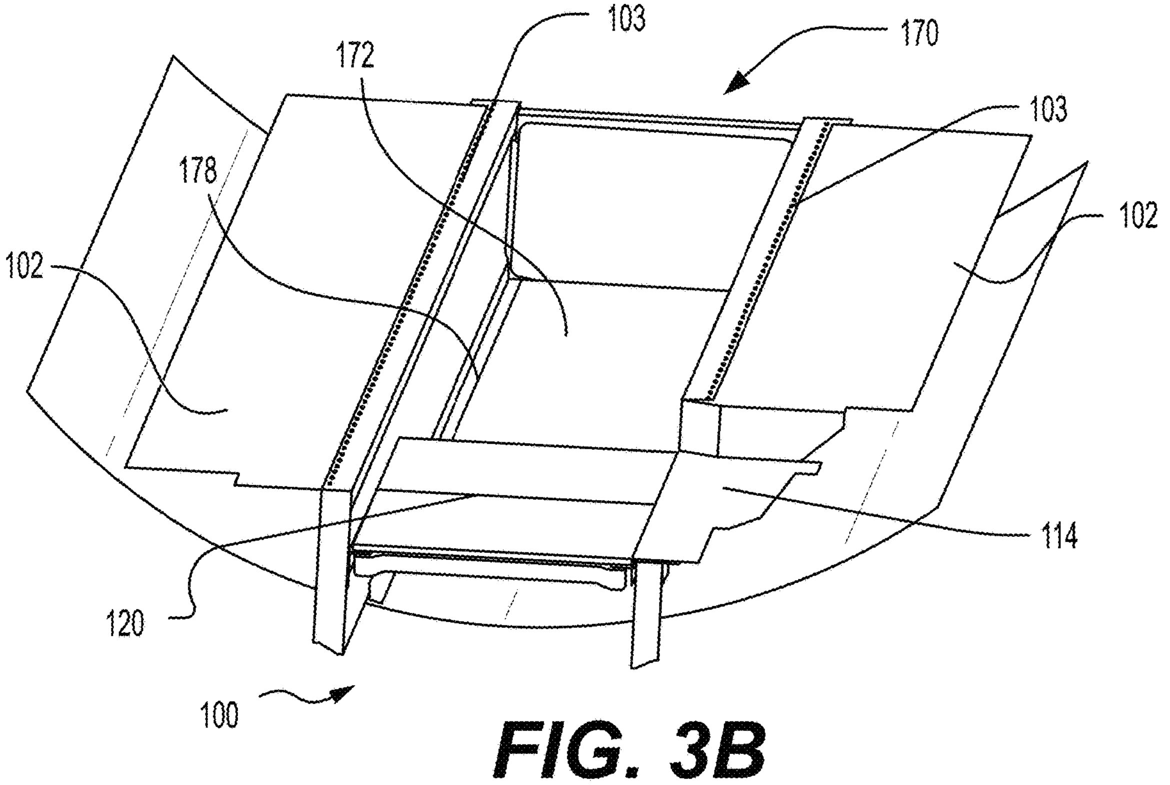
FIG. 3B shows a perspective view of the configurable aircraft aisle flooring system installed in a drop-down aisle configuration.

FIGS. 3A and 3B show a perspective view of an aircraft aisle 100 within the aircraft fuselage 50 shown in FIG. 1. In embodiments, the aircraft aisle 100 spans longitudinally through the center of the fuselage 50 and is positioned in between two upper sections 102. Consistent with the embodiments disclosed herein, the longitudinal direction is defined to be the direction aligned with the length of the aircraft aisle 100 while the lateral direction is defined to be the direction perpendicular to the longitudinal direction that transverses the aircraft aisle. The upper sections 102 are positioned on either side of the aircraft aisle 100 and laterally extend outboard to each edge of the aircraft fuselage 50. The sections 102 provide an upper surface that may include seating (not shown) with aisle floor 105 (see FIG. 5) between the sections 102 serving as a walkway for a user to move about the aircraft. In embodiments, sections 102 and aircraft aisle 100 substantially make a trough with aisle floor 105 being the bottom of the trough. The sections 102 each include a mounting strip 103 disposed along each upper inboard edge and substantially span the length of the aircraft aisle 100. In embodiments, the mounting strip 103 may be a single element or may be a plurality of elements positioned along the inboard edges of sections 102. In FIG. 3A the aircraft aisle 100 is configured in a flat floor configuration 104. The flat floor configuration 104 is a configuration wherein the aircraft aisle 100 is substantially even with the upper surfaces of sections 102. The flat floor configuration 104 includes floor panels 119 which extend between sections 102 and laterally across the aisle floor 105 of aircraft aisle 100. The floor panels 119 are laid side by side with each end of each panel 119 being mounted to abut a corresponding section 102. In embodiments, a plurality of floor panels 119 may be seen in FIG. 3A, but any number of floor panels 119 may be used in the flat floor configuration 104. In embodiments, the flat floor configuration 104 includes an upper floor panel surface 118 with floor panels 119 elevated to be even with and form a flat surface extending between the sections 102 and across the aisle floor 105. The flat floor configuration 104 includes a lower floor panel surface 120 including floor panels 119 elevated to be substantially flush with a lower surface 114. In embodiments, lower surface 114 may be an upper stair on a staircase (not shown) for a user to enter or exit the aircraft 10. The lower surface 114 is at an elevation below the upper surface of sections 102 and above the surface of the aisle floor 105. In embodiments shown, the flat floor configuration 104 includes a ramp 108. The ramp 108 may include a floor panel or floor panels 119 positioned at an angle to provide a ramped floor which connects the upper floor panel surface 118 with the lower floor panel surface 120. In embodiments, and with reference to FIG. 3A, the ramp 108 is sloped to connect the upper floor panel surface 118 and lower floor panel surface 120 at a forward end of the fuselage 50.

Figure 4A:
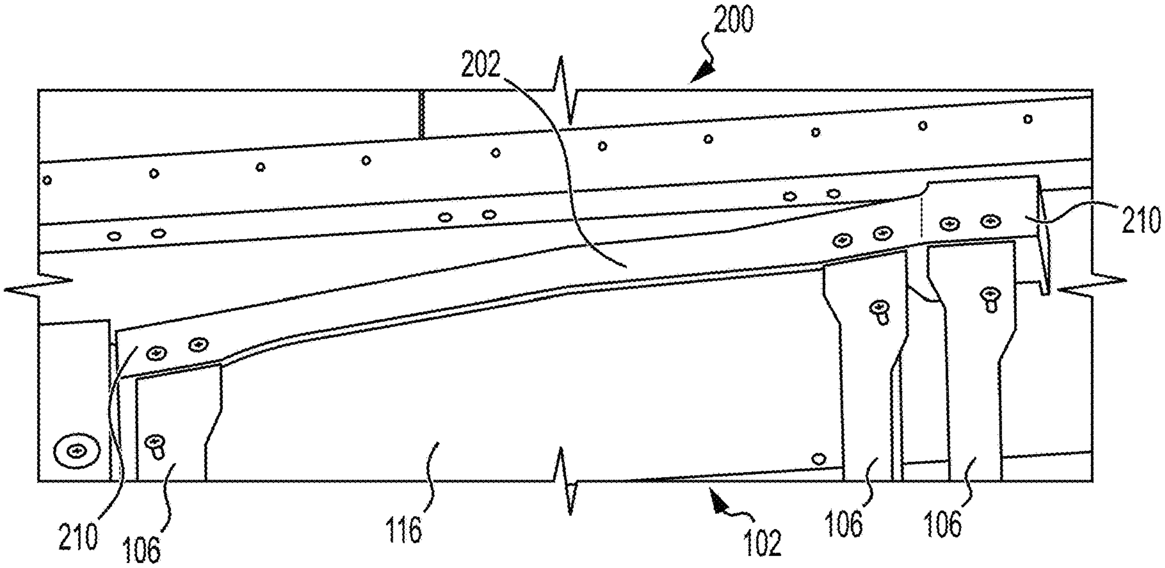
FIG. 4A shows a perspective view of the ramp support structure of the configurable aircraft aisle flooring system.

FIG. 4A shows a close-up perspective view of the ramp support structure 200 of the ramp 108 of FIG. 3A. The ramp support structure 200 includes a longitudinal member 202 secured to a vertical face 116 of the section 102. The longitudinal member 202 extends at an angle upwards as viewed from left to right (i.e., forward to aft in aircraft 10) in FIG. 4A. The angle of the longitudinal member 202 supports the ramp 108 at an angle which allows for the ramped floor to connect the upper and lower floor panel surfaces 118 and 120. In embodiments, longitudinal member 202 is secured to the vertical face 116 using brackets 210 positioned on either end of the longitudinal member 202. The brackets 210 include fastener holes for fastening elements, such as bolts or screws, to secure the longitudinal member 202 to the vertical face 116 of section 102. The longitudinal member 202 includes fastener holes used to secure fastening elements to mount the support members 106 of the flat floor configuration 104 to the longitudinal member 202 of the ramp structure 200.

Figure 4B:
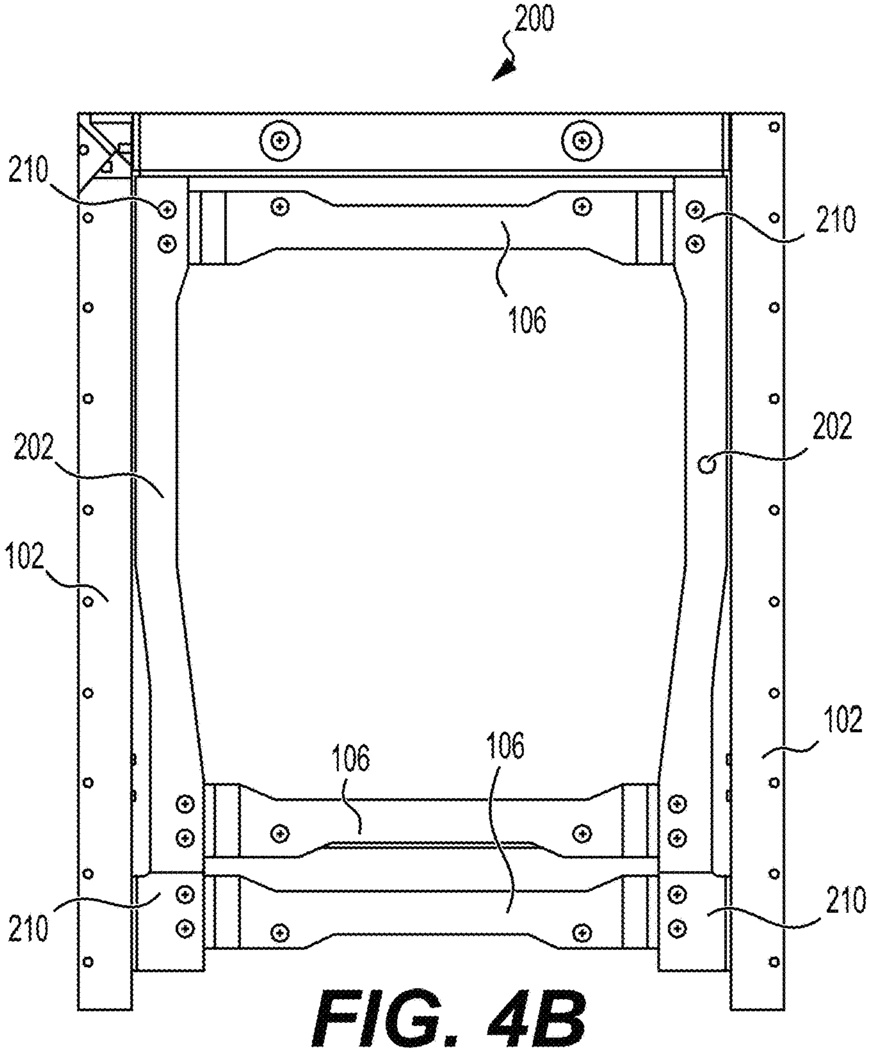
FIG. 4B shows a top perspective view of the ramp support structure of FIG. 4A.

FIG. 4B shows a top-down view of the ramp support structure 200. A second longitudinal member 202 is configured similarly to the longitudinal member 202 on the opposite vertical face 116 of the opposing section 102 such that the support members 106 may attach on each end to the longitudinal members 202. The longitudinal member 202 is configured to mount to each vertical face 116 of each section 102 on either side of the aisle floor 105 of aircraft aisle 100. The support members 106 are oriented to extend laterally across the aircraft aisle 100 beneath the floor panels 119.

Figure 5:
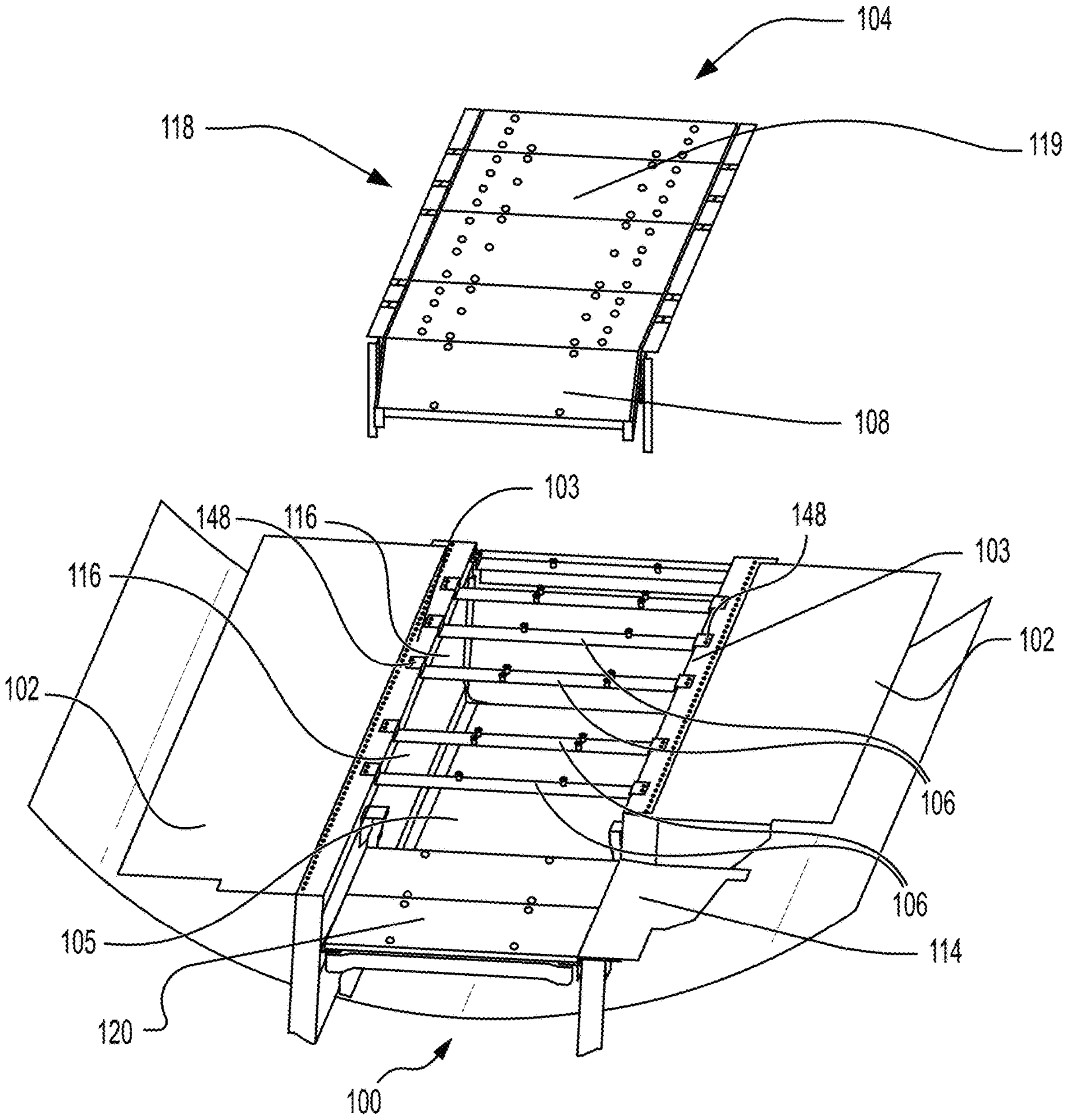
FIG. 5 shows a partially exploded view of the configurable aircraft aisle flooring system in a flat floor configuration.

FIG. 5 shows a partially exploded perspective view of the configurable aircraft aisle 100 configured with the flat floor configuration 104 shown in FIG. 3A. In FIG. 5, the upper floor panel surface 118 is shown exploded away from the aircraft aisle 100 to reveal the support members 106 spanning across the aisle floor 105 of aircraft aisle 100. The flat floor configuration 104 includes support members 106 spanning laterally across the aircraft aisle 100 with each end being mounted to the mounting strip 103 disposed on opposing inboard edges of sections 102. In the embodiment shown in FIG. 5, six support members 106 are configured across the aircraft aisle 100 with spacing between each of the six support members 106. Other embodiments may include any number of support members 106 spanning across the aircraft aisle 100 with many different types and amounts of spacing between members. In embodiments, the upper floor surface 118 is shown separated from the aircraft aisle 100 to reveal the support members 106 positioned across the aircraft aisle 100.

Figure 6A:
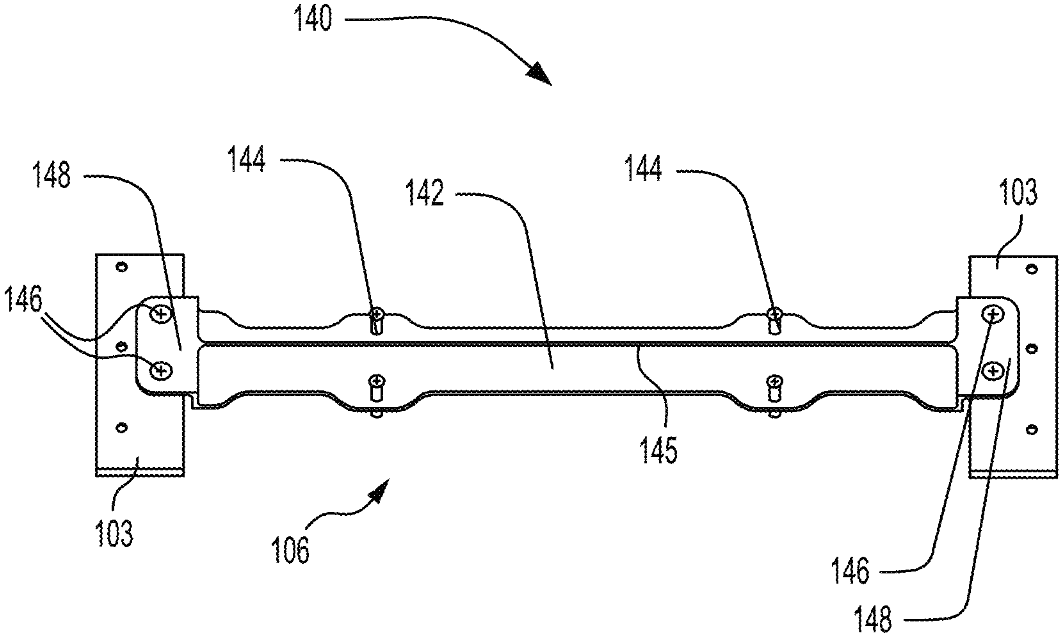
FIG. 6A shows a perspective view of a support member of the configurable aircraft aisle flooring system.
Figure 6B:
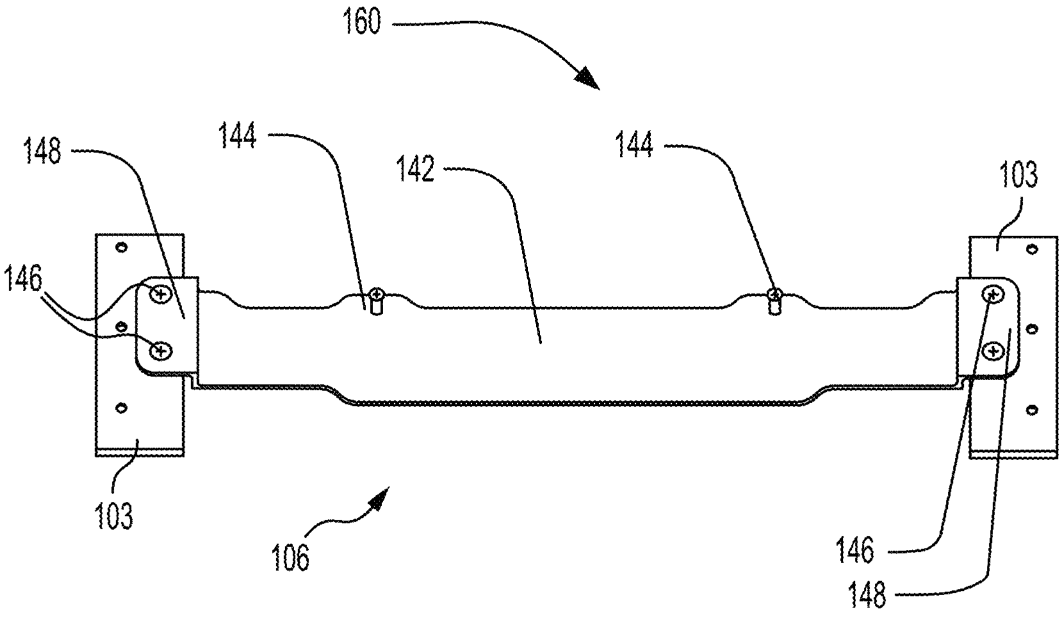
FIG. 6B shows a perspective view of an another support member of the configurable aircraft aisle flooring system.

FIGS. 6A and 6B show a perspective view of a first support member 140 and a second support member 160 in embodiments. First and second support members 140, 160 are embodiments of support members 106 shown in FIG. 5. The first support member 140 and second support member 160 include a lateral member 142 which includes floor fastener holes 144 used to mount floor panels 119 to the first and second support members 140 and 160. First and second support members 140 and 160 can be used to support floor panels 119 forming the upper floor panel surface 118, lower floor surface 120, or ramp 108. First support member 140 includes a gap 145 which spans along the length of the lateral member 142. The gap 145 can be a break in between floor panels placed above the support member 140. The first and second support members 140 and 160 include a mounting bracket 148 on each end and offset from the lateral member 142. Brackets 148 include mounting holes 146 configured to receive a fastening element (e.g. a screw or bolt) to mechanically couple the first and second support members 140 and 160 to the mounting strip 103 disposed on sections 102. With reference to FIGS. 6A and 6B, the mounting strip 103 is shown in segments, however in other embodiments mounting strip 103 may be in a continuous segment on each section 102. In embodiments, the first support member 140 and second support member 160 can be arranged in a variety of different ways to meet support and strength needs. For instance, first support member 140 can be positioned in between floor panels 119 to serve as a supportive joint in between adjacent panels. The second support member 160 can be positioned directly underneath a single floor panel 119 to provide support beneath a singular panel.

Returning to FIG. 5, the upper floor panel surface 118 and floor panels 119 are shown separated from the aircraft aisle 100 revealing support members 106 in between sections 102. The floor panels 119 are laid laterally side by side such that gaps between the floor panels 119 are substantially eliminated. The upper floor panel surface 118 includes ramp 108 which may be a floor panel or floor panels 119 mounted onto the longitudinal member 202 of ramp support structure 200. The floor panels 119 of the upper floor surface 118 may be bolted into place onto the support members 106 using the floor fastener holes 144 and fastening arrangements such as bolts or screws. A lower floor surface 120 also includes floor panels 119 and is substantially flush with the lower surface 114, below the upper edge of the sections 102 and above aisle floor 105.

FIG. 3B shows the aircraft aisle 100 in the drop-down aisle configuration 170. The drop-down aisle configuration 170 includes the lower surface 114 and the lower floor panel surface 120. The lower floor panel surface 120 may include the floor panels 119. The drop-down aisle configuration 170 steps down from the lower floor panel surface 120 to a bottom floor 172. The bottom floor 172 is positioned substantially beneath the upper surface of sections 102 such that the drop-down aisle configuration 170 forms a trough with the bottom floor 172 of the trough being nearly or directly against aisle floor 105 of aircraft aisle 100.

Figure 7:
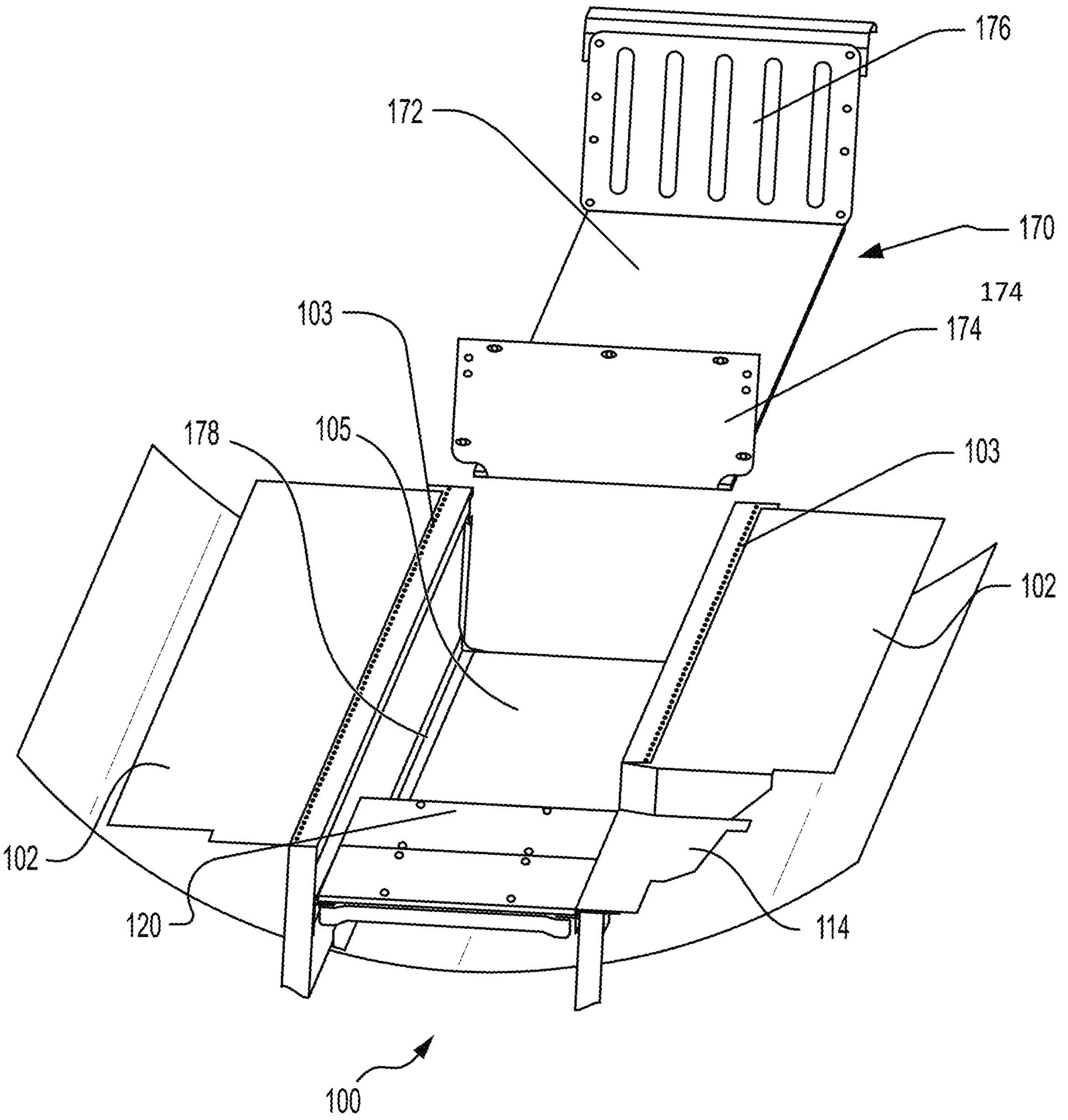
FIG. 7 shows a partially exploded view of the configurable aircraft aisle flooring system in a drop-down aisle configuration.

FIG. 7 shows a partially exploded view of the configurable aircraft aisle 100 with the drop-down aisle configuration 170 of FIG. 3B. The drop-down aisle configuration 170 includes the bottom floor 172, a front panel 174, and a rear panel 176. The front panel 174 extends upwards at the front edge of the bottom floor 172 and the rear panel 176 extends upwards from the back edge of the bottom floor 172 with reference to FIG. 7. The front panel 174 and the rear panel 176 may extend vertically such that an angle of greater than, less than, or equal to ninety degrees is formed between the bottom floor 172 and the front panel 174 or rear panel 176. The drop-down aisle configuration 170 may include floor panels (not shown) with the floor panels being configured to accept a fastening element, such as a hook and loop fastener (e.g., Velcro), to lock in place and preserve space within the fuselage 50. For instance, the hook and loop fastener may be disposed on an upper facing surface of the bottom floor 172 and a lower facing surface of the floor panels (not shown) such that the floor panels may be fastened to the bottom floor 172. When the drop-down aisle configuration 170 is installed, as shown in FIG. 3B, the bottom floor 172 slides adjacent to or against a stringer 178 extending lengthwise along the base of each section 102.

In embodiments, the flat floor configuration 104 and the drop-down aisle configuration 170 may be installed late in the process of the aircraft manufacture. The mounting strips 103 can be built into the sections 102 of the aircraft aisle 100 regardless of which configuration (i.e. flat floor configuration 104 or drop-down aisle configuration 170) is being installed. The mounting strips 103 allow for the support members 106 to be installed when installing the flat floor configuration 104 and does not interfere when the drop-down aisle configuration 170 is being installed. Thus, the mounting strips 103 facilitate installation for either floor configuration. The installation of either the flat floor configuration 104 or the drop-down aisle configuration 170 may be performed in the last steps of aircraft manufacture due to the aircraft aisle 100 and sections 102 being configured similarly regardless of the flat floor configuration 104 or drop-down aisle configuration 170 being installed. Each of the flat floor configuration 104 and the drop-down aisle configuration 170 does not require a change to the aircraft aisle 100 structure allowing for either configuration to be installed in the final steps of the aircraft manufacturing process.

Although the invention has been described with reference to the embodiments illustrated in the attached drawing figures, it is noted that equivalents may be employed and substitutions made herein without departing from the scope of the invention as recited in the claims.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. Having thus described various embodiments of the invention, what is claimed as new and desired to be protected by Letters Patent includes the following:

What is claimed is:

1. A configurable aircraft aisle flooring system, the system comprising:

a configurable floor for an aircraft aisle having a flat floor configuration and a drop-down aisle configuration, wherein the configurable floor comprises:

a trough disposed between a first upper surface and a second upper surface, wherein the first and second upper surfaces are elevated above the trough and the first and second upper surfaces extend outboard from opposing sides of the trough;

a first mounting strip disposed along an inboard edge of the first upper surface and a second mounting strip disposed opposite the first mounting strip along an inboard edge of the second upper surface;

a plurality of floor panels each configured to fasten to the first and second mounting strips for spanning across the trough between the first and second upper surfaces for providing the flat floor configuration; and a drop-down floor configured to attach to the trough when the floor panels are removed to provide the drop-down aisle configuration, wherein the drop-down aisle configuration comprises a bottom floor disposed in between a front panel and a rear panel, the front panel extending upwards at a front edge of the bottom floor and the rear panel extending upwards from a back edge of the bottom floor.

2. The system of claim 1, wherein the drop-down floor is below the first and second upper surfaces in the drop-down aisle configuration and the floor panels form a flat floor that is level with the first and second upper surfaces in the flat floor configuration.

3. The system of claim 1, comprising a plurality of support members each configured to mechanically couple to the first and second mounting strips for supporting the floor panels.

4. The system of claim 3, wherein the support members each include floor fastening arrangements configured to secure the support members to the floor panels.

5. The system of claim 1, comprising a fastening element disposed on the bottom floor configured to fasten the floor panels to the bottom floor in the drop-down aisle configuration.

6. The system of claim 5, wherein the fastening element is a hook and loop fastener.

7. The system of claim 1, wherein the first mounting strip and the second mounting strip each comprise a ramp portion configured to connect from the first and second upper surfaces to a lower surface, the lower surface being elevated above the trough bottom but beneath the first and second upper surfaces.

8. The system of claim 7, comprising a ramp support structure configured to support one or more floor panels for forming a ramped floor.

9. The system of claim 8, wherein the ramp support structure includes a longitudinal member which connects to an outer edge of the ramp support structure and is pitched at an upwards angle relative to the lower surface.

10. The system of claim 9, wherein the longitudinal member is fixed to a plurality of support members beneath the floor panels of the ramped floor.

11. An aisle flooring system for an aircraft, comprising:

a configurable floor for an aircraft aisle wherein the configurable floor comprises:

a flat floor configuration comprising a plurality of floor panels configured to extend above a trough positioned in between a first upper surface and a second upper surface, wherein the first and second upper surfaces are elevated above the trough and the first and second upper surfaces extend outboard from opposing sides of the trough; and a drop-down aisle configuration comprising a bottom floor disposed in between a front panel extending upwards at a front edge of the bottom floor and a rear panel extending upwards from a back edge of the bottom floor, and the bottom floor is configured to attach to the trough in between the first and second upper surfaces;

wherein either the flat floor configuration or the drop-down aisle configuration is disposed in the aircraft.

12. The system of claim 11, comprising fastening strips disposed on the first upper surface and the second upper surface.

13. The system of claim 12, comprising a plurality of support members each configured to mount to the fastening strips beneath the plurality of floor panels and support the floor panels.

14. The system of claim 13, wherein the plurality of support members include a first configuration and a second configuration wherein the first and second configurations include a flat surface and the first configuration includes a gap in its surface.

15. The system of claim 14, wherein the first configuration of support members is disposed in between pairs of adjacent floor panels and supports the pair of floor panels.

16. The system of claim 11, comprising a ramp support structure configured to support the floor panels at an angle to form a ramped floor connecting floor panels level with the first and second upper surfaces and the floor panels level with a lower surface, the lower surface being elevated above the trough bottom but beneath the first and second upper surfaces.

17. A configurable aircraft aisle flooring system, the system comprising:

a configurable aircraft floor configured to provide a flat floor in a first configuration or a drop-down aisle in a second configuration, wherein the configurable aircraft floor comprises:

a pair of outboard sections positioned at an upper elevation along outboard sides of an aircraft fuselage;

an inboard section positioned at a lower elevation between the pair of outboard sections;

a first mounting strip disposed along an upper edge of a first outboard section of the pair;

a second mounting strip disposed along an upper edge of a second outboard section of the pair, opposite the first outboard section, wherein a plurality of support members are configured to mechanically couple to corresponding mounting strips on the pair of outboard sections, and a plurality of floor panels are configured to be secured to the plurality of support members for forming the flat floor above the inboard section and level with the upper elevation;

a mounting rail disposed above the inboard section, wherein the inboard section is configured to receive the drop-down aisle that mounts to the mounting rail for forming the drop-down aisle at the lower elevation;

a middle elevation having floor panels which are elevated above the lower elevation but beneath the upper elevation; and a ramped floor having angled floor panels configured to provide a ramp connecting the floor panels of the upper elevation with floor panels at the middle elevation.

* * * * *